US012599164B2

(12) United States Patent (10) Patent No.: US 12,599,164 B2
Santos Vale (45) Date of Patent: Apr. 14, 2026

(54) AEROSOL-GENERATING ARTICLE COMPRISING AN AEROSOL-COOLING ELEMENT

(71) Applicant: PHILIP MORRIS PRODUCTS S.A., Neuchatel (CH)

(72) Inventor: Miguel Lereno Santos Vale, Aarau (CH)

(73) Assignee: Philip Morris Products S.A., Neuchatel (CH)

( * ) Notice: Subject to any disclaimer, the term of this patent is extended or adjusted under 35 U.S.C. 154(b) by 1141 days.

(21) Appl. No.: 16/969,419

(22) PCT Filed: Jan. 23, 2019

(86) PCT No.: PCT/EP2019/051668
§ 371 (c)(1),
(2) Date: Aug. 12, 2020

(87) PCT Pub. No.: WO2019/158334
PCT Pub. Date: Aug. 22, 2019

(65) Prior Publication Data
US 2021/0000162 A1     Jan. 7, 2021

(30) Foreign Application Priority Data

Feb. 15, 2018     (EP) ..................................... 18156998

(51) Int. Cl.
*A24C 5/01*          (2020.01)
*A24D 1/20*          (2020.01)
(Continued)

(52) U.S. Cl.
CPC .................. *A24C 5/01* (2020.01); *A24D 1/20* (2020.01); *A24D 3/17* (2020.01); *B29C 48/002* (2019.02);
(Continued)

(58) Field of Classification Search
CPC ... A24D 1/20; A24D 1/22; A24D 3/17; A24D 3/04; A24D 3/063; A24D 3/10; A24C 5/01
See application file for complete search history.

(56) References Cited

U.S. PATENT DOCUMENTS 4,457,975 A * 7/1984 Bahder ................ H01B 7/2813
                                                           428/394
9,259,031 B2    2/2016 Branton
                (Continued)

FOREIGN PATENT DOCUMENTS

CN          107427076         12/2017
CN          207341183 U  *   5/2018   ............. A24F 40/46
                (Continued)

OTHER PUBLICATIONS

Celanese, Safety Data Sheet, Celanese, all pages (Year: 2015).*
(Continued)

*Primary Examiner* — Michael H. Wilson
*Assistant Examiner* — Stephanie Lynn Moore
(74) *Attorney, Agent, or Firm* — Mueting Raasch Group

(57) ABSTRACT

An aerosol-generating article comprises an aerosol-cooling element. The aerosol-cooling element comprises an extruded member (100) having a length (108), and comprising an external surface (104) defining the perimeter of a cross section perpendicular to the length of the extruded member; and an internal surface (102) defining one or more pathways (110) through the length of the extruded member. The internal surface or the external surface or both the internal surface and the external surface comprise surface irregularities.

16 Claims, 10 Drawing Sheets

(51) Int. Cl.

| | |
|---|---|
| *A24D 3/17* | (2020.01) |
| *B29C 48/00* | (2019.01) |
| *B29C 48/11* | (2019.01) |
| *B29K 67/00* | (2006.01) |
| *B29L 31/00* | (2006.01) |
| *B29L 31/18* | (2006.01) |

(52) U.S. Cl.
CPC .......... *B29C 48/0022* (2019.02); *B29C 48/11* (2019.02); *B29K 2067/046* (2013.01); *B29L 2031/18* (2013.01); *B29L 2031/7414* (2013.01)

(56) References Cited

U.S. PATENT DOCUMENTS

| | | | |
|---|---|---|---|
| 10,588,345 | B2 | 3/2020 | Nakano |
| 2011/0109013 | A1 | 5/2011 | Hashiba |
| 2013/0133675 | A1* | 5/2013 | Shinozaki ................ A24D 1/22 |
| | | | 131/329 |
| 2014/0305448 | A1 | 10/2014 | Zuber |
| 2015/0027475 | A1 | 1/2015 | Jarriault |
| 2017/0042221 | A1 | 2/2017 | England |
| 2019/0124985 | A1* | 5/2019 | Wu ......................... A24F 40/46 |

FOREIGN PATENT DOCUMENTS

| | | |
|---|---|---|
| GB | 2534208 | 7/2016 |
| GB | 2534211 | 7/2016 |
| JP | 6005735 | 10/2016 |
| RU | 2581999 | 4/2016 |
| RU | 2609394 | 2/2017 |
| WO | WO 2013/120565 | 8/2013 |
| WO | WO 2015/166245 | 11/2015 |

OTHER PUBLICATIONS

Celanese, Cellulose Acetate Tow product description, https://www.celanese.com/products/cellulose-acetate-tow, all pages, accessed: Jun. 24, 2024. (Year: 2024).*

Celanese Cigarette Filter Tow, https://www.celanese.com/applications/cigarette-filtration, all pages, accessed: Jun. 24, 2024. (Year: 2024).*

Hetjonk, Beckie, et al. "PTFE Machinery" PTFE Machinery, May 17, 2009, ptfe-machinery.com/plastic-extrusion-basic-information-supplies-process-design/. (Year: 2009).*

Office Action issued in China for Application No. 201980009606.2 dated Apr. 1, 2022 (10 pages).

Office Action issued in Russia for Application No. 2020126716/03 dated Nov. 19, 2021 (11 pages). English translation included.

PCT Search Report and Written Opinion for PCT/EP2019/051668 dated Mar. 27, 2019 (14 pages).

European Search Report for Application No. 18156998.9 dated Aug. 14, 2018 (8 pages).

Notice of Allowance issued in Korea for Application No. 10-2020-7022755 dated Feb. 25, 2025 (10 pages). English translation included.

* cited by examiner

500

START

502

ADD PLA MATERIAL

504

TRANSFER PLA MATERIAL TO BARREL

506

MELT PLA MATERIAL

508

FORCE MOLTEN MATERIAL INTO DIE

510

COOL EXTRUDED MATERIAL

512

PULL EXTRUDED MATERIAL

514

CUT EXTRUDED MATERIAL

FINISH

AEROSOL-GENERATING ARTICLE COMPRISING AN AEROSOL-COOLING ELEMENT

This application is a U.S. National Stage Application of International Application No. PCT/EP2019/051668 filed Jan. 23, 2019, which was published in English on Aug. 22, 2019 as International Publication No. WO 2019/158334 A1. International Application No. PCT/EP2019/051668 claims priority to European Application No. 18156998.9 filed Feb. 15, 2018.

The present invention relates to an aerosol-generating article comprising an aerosol-cooling element, and to methods for producing an aerosol-cooling article. In particular, the present invention relates to an extruded aerosol-cooling element and to methods of extruding an aerosol-cooling element.

Aerosol-generating articles in which an aerosol-generating substrate, such as a tobacco-containing substrate, is heated rather than combusted, are known in the art. Typically, in such heated articles, an aerosol is generated by the transfer of heat from a heat source to a physically separate aerosol-generating substrate or material, which may be located in contact with, within, around, or downstream of the heat source. During use of the aerosol-generating article, volatile compounds are released from the aerosol-generating substrate by heat transfer from the heat source and are entrained in air drawn through the aerosol-generating article. As the released compounds cool, they condense to form an aerosol.

Aerosol-generating articles may comprise a plurality of elements assembled in the form of a rod. These elements may include an aerosol-forming substrate and an aerosol-cooling element located downstream from the aerosol-forming substrate.

Aerosol cooling elements may comprise pathways through which aerosol travels, the purpose of which is to maintain an appropriate temperature of the aerosol.

The manufacture of aerosol-cooling elements may comprise forming raw material into a foil or web. The foil or web may then be crimped, the term 'crimped' denotes a sheet having a plurality of substantially parallel ridges or corrugations. The crimped foil may then be folded by compressing through a funnel to provide a continuous rod having a diameter similar to or less than the diameter of the final tubular rod. The continuous rod may then be wrapped in a wrapping paper. An adhesive may be applied to one edge of the wrapping paper so that it can be closed around the continuous rod. The wrapped continuous rod may then be compressed into a final desired shape while being heated to dry or cure the applied adhesive. The wrapped continuous rod may then be cut into discrete rods of smaller length to produce cooling element components for use in the final aerosol-generating articles. Such an element has a high internal surface area from the folded, crimped sheet.

The manufacture of aerosol-generating articles comprising aerosol-cooling elements as described above can present several problems during production and in the finished aerosol-generating article, often due to a high mechanical resistance to compression of the materials used. This may make it difficult to achieve a consistent profile of the aerosol-cooling element. Furthermore, in some processes, the adhesive may fail to hold the wrapping paper properly closed around the rod. Another issue may be a failure of diameter control due to expansion of the wrapping paper over time. A yet further issue may be a failure of weight control due to variation in the foil or web used in the production of such aerosol-cooling elements.

It may therefore be desirable to provide an alternative method of manufacture of aerosol-cooling elements that mitigate the above issues.

According to one aspect of the invention there is provided an aerosol-generating article comprising an aerosol-cooling element, wherein the aerosol-cooling element comprises an extruded member; the extruded member having a length, and the extruded member comprising: an external surface defining the perimeter of a cross section perpendicular to the length of the extruded member and an internal surface defining one or more pathways through the length of the extruded member; wherein the internal surface or the external surface or both the internal surface and the external surface comprise surface irregularities.

According to another aspect of the invention there is provided a method of manufacturing an aerosol-cooling element of an aerosol-generating article, the method comprising: providing a material; extruding the material through a die to form a continuous extruded structure comprising an internal surface and an external surface of the material, the internal surface defining one or more pathways within the continuous extruded structure and the external surface defining a perimeter of a cross section of the continuous extruded structure; inducing surface irregularities in the external surface or the internal surface or both the external surface and the internal surface; and cutting the continuous extruded structure to form the aerosol-cooling element.

According to another aspect of the invention there is provided a method for making an aerosol-generating article comprising: forming an aerosol-cooling element according to the foregoing aspects of the invention and incorporating the aerosol-cooling element into an aerosol-generating article.

In a further aspect, there is provided an aerosol-cooling element, as described herein, for use in an aerosol-generating article.

In a further aspect, there is provided the use of an aerosol-cooling element as described herein, in an aerosol-generating article.

By forming the aerosol-cooling element as a continuous extruded structure by an extrusion process, it is possible to avoid the compression and wrapping steps of prior art processes. The extruded aerosol-cooling element of embodiments of the present disclosure may retain its shape without the need for a paper or other wrapping, and this helps to avoid the problems associated with adhesive failure. Moreover, the extrusion process may result in aerosol-cooling elements having a well-defined and consistent cross-section or profile, as well as a substantially consistent weight distribution along the lengths of the elements. Because embodiments of the present disclosure do not comprise a compressed sheet, internal stresses which may cause the aerosol-cooling element to expand are avoided. Extrusion also provides a substantially constant and controllable outer diameter for the aerosol-cooling elements, and there is no need for adhesive. Moreover, since embodiments of the present disclosure provide a one-step process for forming the aerosol-cooling elements, and require only a single material, there is an improved ease and economy of manufacture.

Any references below to preferred features or aspects should be considered to be applicable to all aspects of the present invention.

As used herein, the term "aerosol-generating article" may refer to an aerosol-generating article for producing an aerosol comprising an aerosol-generating substrate. The term aerosol-generating article encompasses articles that are intended to be heated to release volatile compounds that can form an aerosol, optionally the term aerosol-generating article may also encompass articles that are intended to be combusted to release volatile compounds.

As used herein, the term "aerosol-generating substrate" may refer to a substrate capable of releasing upon heating volatile compounds, which can form an aerosol. The aerosol generated from aerosol-generating substrates of aerosol-generating articles described herein may be visible or invisible and may include vapours (for example, fine particles of substances, which are in a gaseous state, that are ordinarily liquid or solid at room temperature) as well as gases and liquid droplets of condensed vapours.

As used herein, the terms "upstream" and "downstream" may describe the relative positions of elements, or portions of elements, of the aerosol-generating article in relation to the direction in which the aerosol is transported through the aerosol-generating article during use.

As used herein, the term 'rod' is used to denote a generally cylindrical element of substantially circular, oval or elliptical cross-section.

As used herein, the term "extruded" may refer to a member that has been formed by at least partially melting a material by way of a heating process and then extruding the at least partially melted material through a die to form the extruded member. An extruded member may be distinguished from a non-extruded member by characteristic features such as longitudinal striations and/or a substantially constant cross-section along a longitudinal extent of the member.

As used herein, the term "aerosol-cooling element" is used to describe an element having a large surface area and a low resistance to draw. In use, an aerosol formed by volatile compounds released from the aerosol-generating substrate is drawn through the aerosol-cooling element before being transported to the mouth end of the aerosol-generating article.

In contrast to high resistance-to-draw filters, for example filters formed from bundles of fibres, and other mouthpiece segments, aerosol-cooling elements have a low resistance to draw. Chambers and cavities within an aerosol generating article such as expansion chambers and support elements are also not considered to be aerosol cooling elements. However, some aerosol-cooling elements may optionally perform a filtering function, and/or may also be referred to as a filter.

As used herein, the term "external surface" may refer to an outer, exposed surface of the extruded member, for example the surface defined by an outer perimeter of the extruded member As used herein, the term "internal surface" may refer to inner surfaces of the extruded member defining one or more walls of the pathway(s) through the extruded member along its length from one end to another.

As used herein, the term "pathways" may refer to passages or tunnels through an internal volume of the extruded member allowing passage of aerosol through the extruded member along its length from the aerosol-generating substrate to the mouthpiece when the extruded member is configured as an aerosol-cooling element.

As used herein, the term "length" may refer to a distance from a first end of an extruded member to a second end, in a longitudinal direction along which a cross-section of the extruded member is substantially constant.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

The aerosol-cooling element may comprise one or more pathways through the aerosol element. In some embodiments, the one or more pathways may comprise between 50% to 90%, or optionally between 60% and 80%, or optionally between 65% and 75% of the area of cross section defined by the external surface. This may be quantified by inspecting a cross-section of the aerosol-cooling element using a measuring microscope. The pathways may be identified by applying a threshold to an image of a cross section of the element, to separate the pathways from the element internal structure. The pathway pixels may then be counted to determine the total cross sectional area of the pathways. In some embodiments, the aerosol-cooling element may comprise two or more pathways. In embodiments where the aerosol-cooling element comprises two or more pathways, the % area of the area of cross section defined by the external surface is the cumulative area of cross section occupied by the pathways.

The extruded member may have a circular cross section of diameter from 5 to 10 mm, optionally from 6 to 9 mm, or optionally from 7 to 8 mm.

The extruded member may have a length from 7 to 28 mm, or optionally from 10 to 25 mm, or optionally from 13 to 22 mm, optionally from 16 to 19 mm.

The extruded member may comprise or be formed from a polymer material. The polymer material may be one or more of a thermoplastic polymer, a biopolymer and a biodegradable polymer. Suitable biodegradable polymers may comprise one or more of starch, aliphatic polymers and cellulose polymers. The polymer material may be semi-crystalline. The polymer may comprise lactide monomer or copolymer, and in certain embodiments may comprise polylactic acid.

The internal surface or the external surface or both the internal surface and the external surface comprise surface irregularities. Such surface irregularities may be desirable to increase thermal transfer with air. For example, cooling the extruded material after extrusion by contact with a cooled substance may induce thermal stresses in the extruded material. These thermal stresses may lead to the formation of cracks in the external surface, which may increase surface area, and therefore thermal transfer with air when the extruded member is used as an aerosol-cooling element.

Cooling the material may comprise rapidly cooling to induce surface irregularities in the external surface and/or internal surface.

The aerosol-generating article may further comprise an aerosol-generating substrate and a filter and the aerosol-cooling element may be positioned between the filter and aerosol-generating substrate.

Before the continuous extruded structure is cut, the method may further comprise providing the continuous extruded structure and extruding further material through a second die to coat the continuous extruded structure with an extruded outer coating.

Passing the material through the die and/or passing the material through the second die may comprise inducing irregularities in the external surface and/or internal surface.

Changing a rate of extrusion may be used to control the external surface diameter. A faster rate of extrusion may result in a thinner external surface diameter whereas a slower rate of extrusion may result in a thicker external surface diameter. If it is determined, for example by a diameter checking system, that the external surface diameter is too thin, a signal may be sent to an apparatus control system to reduce the rate of extrusion. Alternatively, if it is determined, for example by a diameter checking system, that the external surface diameter is too thick, a signal may be sent to an apparatus control system to increase the rate of extrusion.

The aerosol-generating article of the present invention may be configured for use with a separate heating device. Such a heating device can interact with an aerosol-forming substrate to generate an aerosol. The aerosol-generating article of the present invention may itself comprise a heat source and at least one heat-conducting element for transferring heat from the heat source to the aerosol-forming substrate of the article.

In some embodiments, the aerosol-generating article may be a smoking article, such as a filter cigarette or other smoking article, in which an aerosol-generating substrate comprises a tobacco material that is combusted to form smoke. Therefore, in any of the embodiments described above, the aerosol-generating substrate may comprise a tobacco rod. Furthermore, in any of the embodiments described above, the mouthpiece may be a filter. In such embodiments, the filter may be secured to the tobacco rod by a tipping paper.

The mouthpiece may comprise one or more segments disposed upstream of the mouthpiece segment. The one or more segments may include one or more of a support element, an aerosol-cooling element and a filter segment.

A support element may be located immediately downstream of the aerosol-forming substrate and may abut the aerosol-forming substrate. The support element may be formed from any suitable material or combination of materials. For example, the support element may be formed from one or more materials selected from the group consisting of: cellulose acetate; cardboard; crimped paper, such as crimped heat resistant paper or crimped parchment paper; and polymeric materials, such as low density polyethylene (LDPE). In a preferred embodiment, the support element is formed from cellulose acetate. The support element may comprise a hollow tubular element. In a preferred embodiment, the support element comprises a hollow cellulose acetate tube. The support element preferably has an external diameter that is approximately equal to the external diameter of the aerosol-generating article. The support element may have an external diameter of between approximately 5 millimetres and approximately 12 millimetres, for example of between approximately 5 millimetres and approximately 10 millimetres or of between approximately 6 millimetres and approximately 8 millimetres. In a preferred embodiment, the support element has an external diameter of 7.2 millimetres+/– 10%. The support element may have a length of between approximately 5 millimetres and approximately 15 millimetres. In a preferred embodiment, the support element has a length of approximately 8 millimetres.

The aerosol-cooling element may be located downstream of the aerosol-forming substrate, for example an aerosol-cooling element may be located immediately downstream of a support element, and may abut the support element.

The aerosol-cooling element may have a large surface area, but with a low pressure drop over its length. Filters and other mouthpieces may produce a comparatively higher pressure drop, for example filters formed from bundles of fibres, are not considered to be aerosol-cooling elements.

It will be appreciated that preferred features described above in relation to one aspect of the invention may also be applicable to other aspects of the invention.

Embodiments of the invention will now be described, by way of example only, with reference to the accompanying drawings, in which.

The present invention relates to an aerosol-generating article comprising an aerosol-forming substrate and an aerosol-cooling element for cooling an aerosol formed from the aerosol-forming substrate. Aerosol-generating articles in which an aerosol-forming substrate, such as a tobacco containing substrate, is heated rather than combusted are known in the art. Examples of systems using aerosol-generating articles include systems that heat a tobacco containing substrate above 200 degrees Celsius to produce a nicotine containing aerosol.

An aerosol-generating article, in an embodiment of the present invention, comprises an aerosol-cooling element, wherein the aerosol-cooling element comprises an extruded member.

Figure 1:
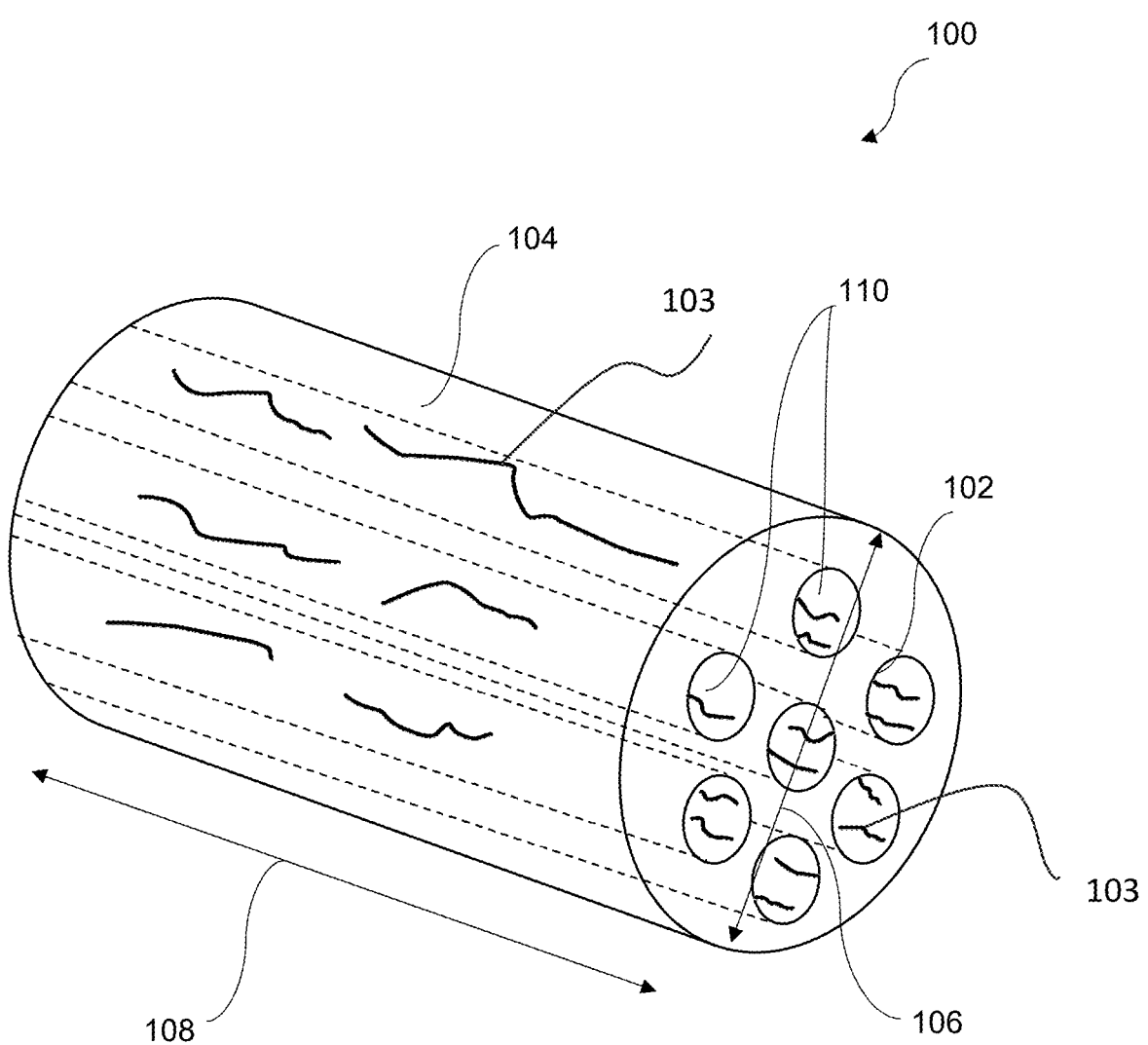
FIG. 1 shows an extruded member according to an embodiment of the present invention.

FIG. 1 shows an aerosol-cooling element comprising an extruded member 100 according to an embodiment of the present invention. Extruded member 100 has a length 108 and comprises an external surface 104 defining the perimeter of a cross section perpendicular to the length 108 of the extruded member 100. An internal surface 102 defining one or more pathways 110 through the length 108 of the extruded member 100 is shown.

In some embodiments, the one or more pathways 110 comprise between 50% to 90% of the area of cross section defined by the external surface 104. The extruded member 100 comprises two or more pathways 110. In this particular embodiment, seven pathways are shown.

In some embodiments, the extruded member 100 has a circular cross section of diameter 106 from 5 to 10 mm.

In some embodiments, the extruded member 100 has a length 108 from 7 to 28 mm.

In some embodiments, the extruded member 100 comprises, or is made from, polylactic acid (PLA).

In some embodiments, the internal surface 102 and/or the external surface 104 of the extruded member 100 comprise surface irregularities 103. Surface irregularities 103 may be any non-smooth features (e.g. cracks, holes, breaks, bumps etc.) on the external surface 104 or internal surface 102 of the extruded member 100.

Figure 2:
FIG. 2 shows a cross sectional schematic diagram of an aerosol-generating article comprising the extruded member according to an embodiment of the present invention.
Figure 2:
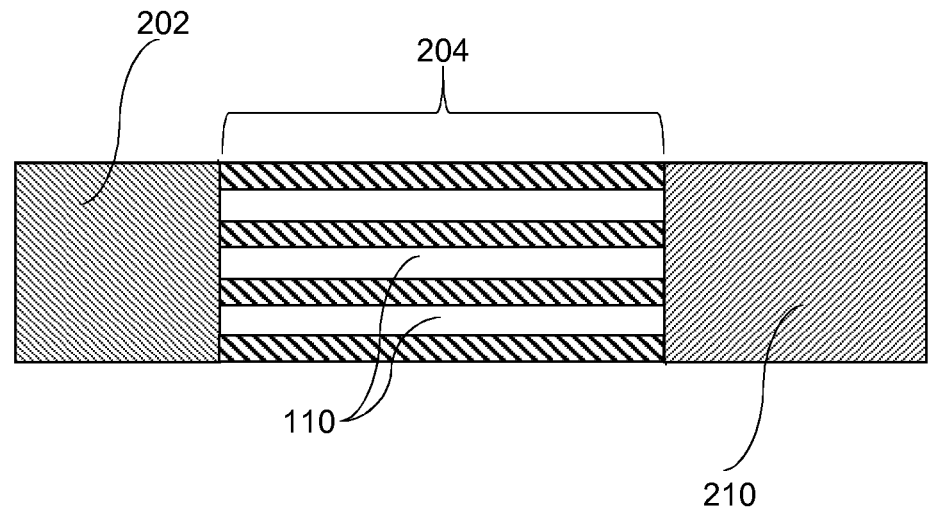

FIG. 2 shows a cross sectional diagram of aerosol-generating article 200 according to an embodiment of the present invention. Aerosol-generating article 200 comprises an aerosol-generating substrate 202, an aerosol-cooling element 204 and a filter 210. As is shown in FIG. 2, the aerosol-cooling element 204 is positioned between the filter 210 and aerosol-generating substrate 202. The aerosol-cooling element 204 may comprise an extruded member 100 as shown in FIG. 1 including two or more pathways 110.

In some embodiments, the filter 210 is a conventional mouthpiece filter formed from cellulose acetate and may have a length of about 45 millimetres.

The aerosol-cooling element 204 may act to cool the temperature of a stream of aerosol drawn through the element by means of thermal transfer. Components of the aerosol may interact with the aerosol-cooling element 204 and lose thermal energy.

The aerosol-cooling element 204 may act to cool the temperature of a stream of aerosol drawn through the element by undergoing a phase transformation that consumes heat energy from the aerosol stream. For example, the material forming the aerosol-cooling element may undergo a phase transformation such as melting or a glass transition that requires the absorption of heat energy. If the element 204 is selected such that it undergoes an endothermic reaction at the temperature at which the aerosol enters the aerosol-cooling element 204, then the reaction will consume heat energy from the aerosol stream.

In some embodiments, the temperature of an aerosol stream may be lowered by more than 10 degrees Celsius as it is drawn through the aerosol-cooling element 204. In some embodiments, the temperature of an aerosol stream may be lowered by more than 15 degrees Celsius or more than 20 degrees Celsius as it is drawn through the aerosol-cooling element 204. When the aerosol enters the aerosol-cooling element 204, its temperature is about 60 degrees Celsius. Due to cooling within the aerosol-cooling element 204, the temperature of the aerosol as it exits the aerosol-cooling element may be about 40 degrees Celsius. Furthermore, the water content of the aerosol may be reduced.

Aerosol formed by heating a tobacco-based substrate will typically comprise phenolic compounds. Using an aerosol-cooling element 204 consistent with the embodiments discussed herein may reduce levels of phenols and cresols by 90% to 95%. In some examples, phenolic compounds may be removed by interaction with the material forming the aerosol-cooling element 204. The phenolic compounds (for example, phenols and cresols) may be adsorbed by the material from which the aerosol-cooling element 204 is formed from.

Figure 3:
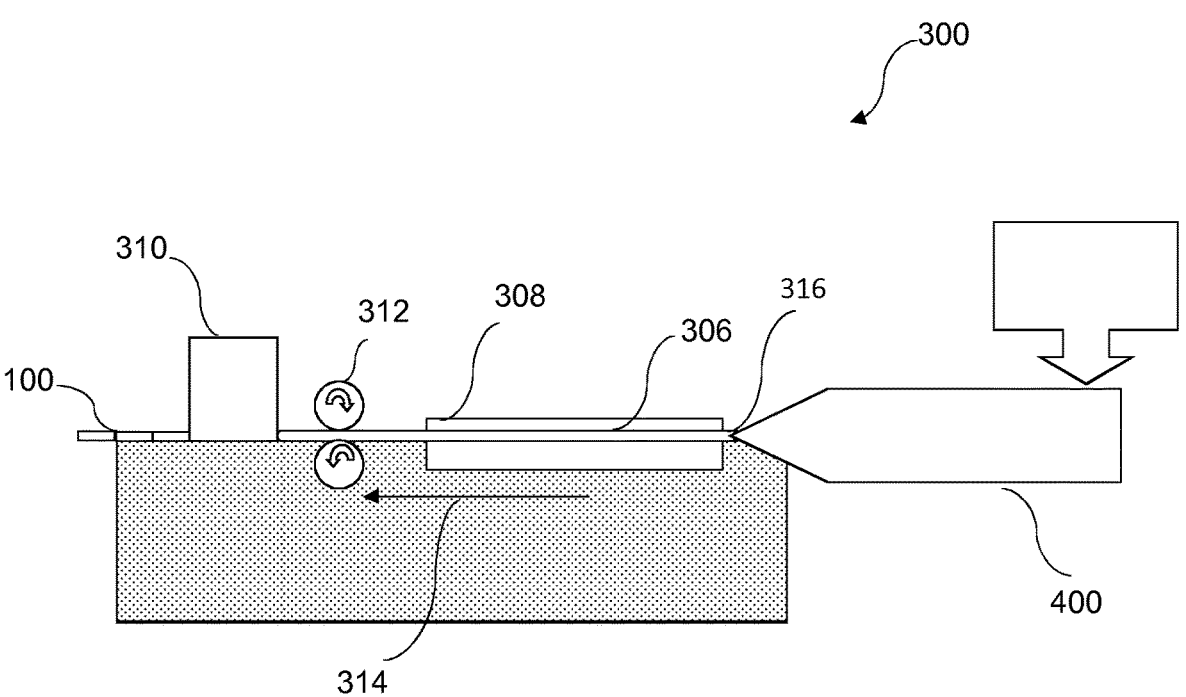
FIG. 3 shows a schematic diagram of an apparatus for production of aerosol-cooling elements according to an embodiment of the present invention.

FIG. 3 shows a schematic diagram of an apparatus 300 for manufacturing aerosol-cooling elements 100, 204 according to an embodiment of the present invention. The manufacturing apparatus 300 comprises a plastics extruder 400 for extruding at least partially molten polymer through a die 316, a cooling unit 308 to cool the extruded polymer so that it retains its extruded shape and does not deform in an unwanted manner, a puller system 312 to pull extruded and at least partially solidified polymer away from the die 316 and a cutter 310 to cut the extruded polymer into individual extruded members of desired length. The plastics extruder 400 produces a continuous extruded structure 306 which is further processed by the cooling unit 308, the puller system 312 and the cutter 310.

Figure 4:
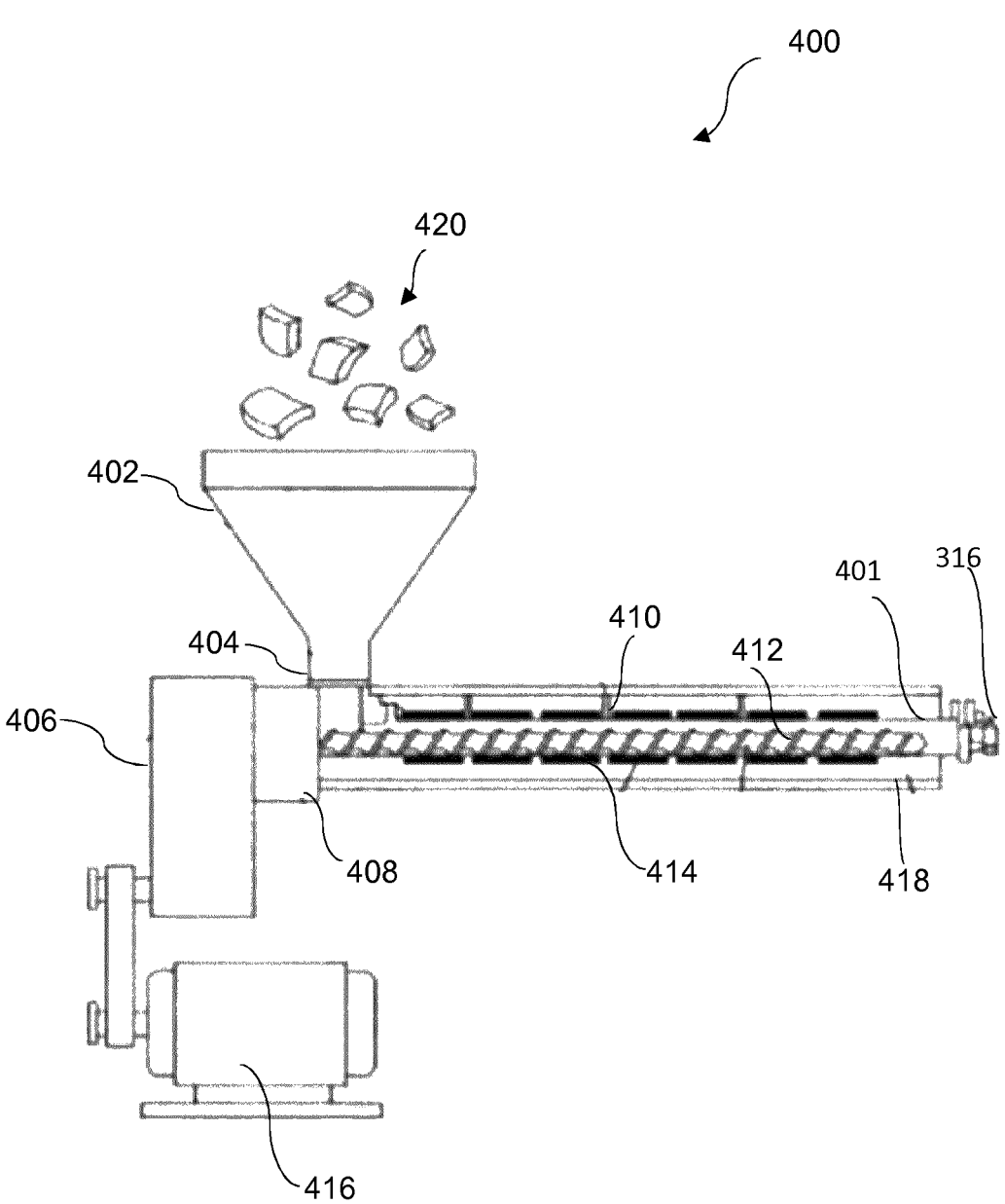
FIG. 4 shows a schematic diagram of a plastics extruder.

FIG. 4 is a schematic diagram of an exemplary plastics extruder 400. The plastics extruder 400 comprises a hopper 402 for holding chips of polymer raw material 420, a feed throat 404 for feeding the chips of raw material 420 into a shaft 401 of the extruder 400, a motor 416, a thrust bearing 408, a screw 412 driven by the motor 416 by way of a gear reducer 406, the screw 412 driving the polymer raw material 420 along the shaft 401 towards the extrusion die 316, a thermocouple 410 to measure temperature, heating elements 414 to at least partially melt the polymer raw material 420, and a barrel 418.

Figure 5:
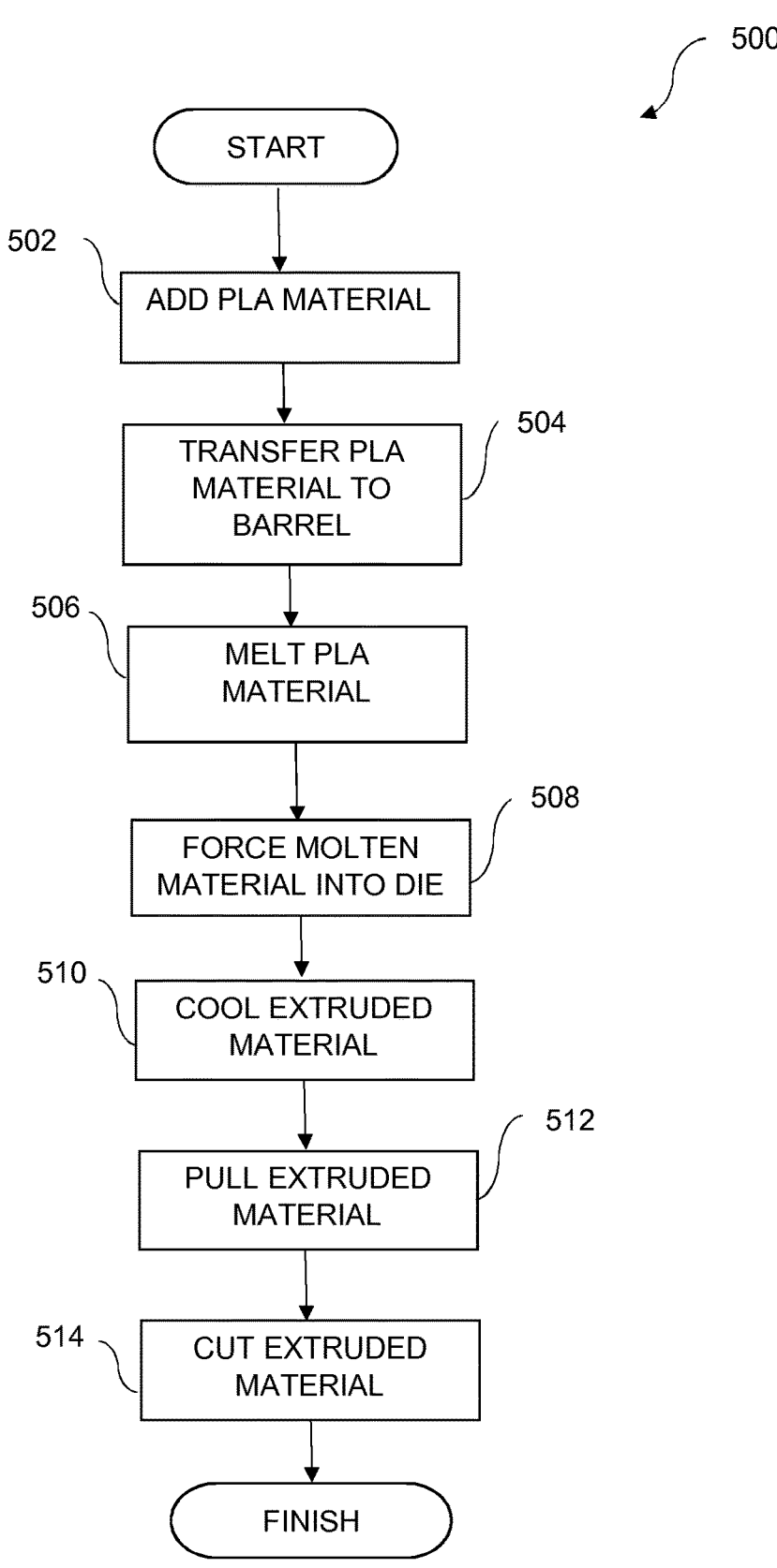
FIG. 5 shows a flow diagram of a method of manufacturing an aerosol-cooling element of an aerosol-generating article according to an embodiment of the present invention.

FIG. 5 is a flow chart illustrating a method 500 of manufacturing the aerosol-cooling element 100, 204 of an aerosol-generating article according to an embodiment of the present invention. In the method 500 of FIG. 5, the internal surface 102 and the external surface 104 of the extruded member 100 are formed by extrusion simultaneously using the apparatus 300 of FIGS. 3 and 4. With reference to method 500 in FIG. 5, raw material 420 (for example, chips of PLA) is added 502 to the hopper 402 which transports 504 the raw material 420 to the barrel 418 of the plastics extruder 400. The raw material 420 is gradually melted 506 by the heating elements 414 into molten material. The screw 412 forces 508 the molten material into a die 316 coupled to an end of the barrel 418. Extruded material exiting the die 316 in the form of the continuous extruded structure 306, in a direction as shown by arrow 314, is cooled 510 by cooling unit 308. The cooled continuous extruded structure 306 is then pulled 512 by a puller system 312. The continuous extruded structure 306 is then cut 514 by cutting machine 310 to produce the extruded members 100 to be used as the aerosol-cooling elements 204 for use in aerosol-generating articles, for example, the aerosol-generating article 200 in FIG. 2.

Figure 6:
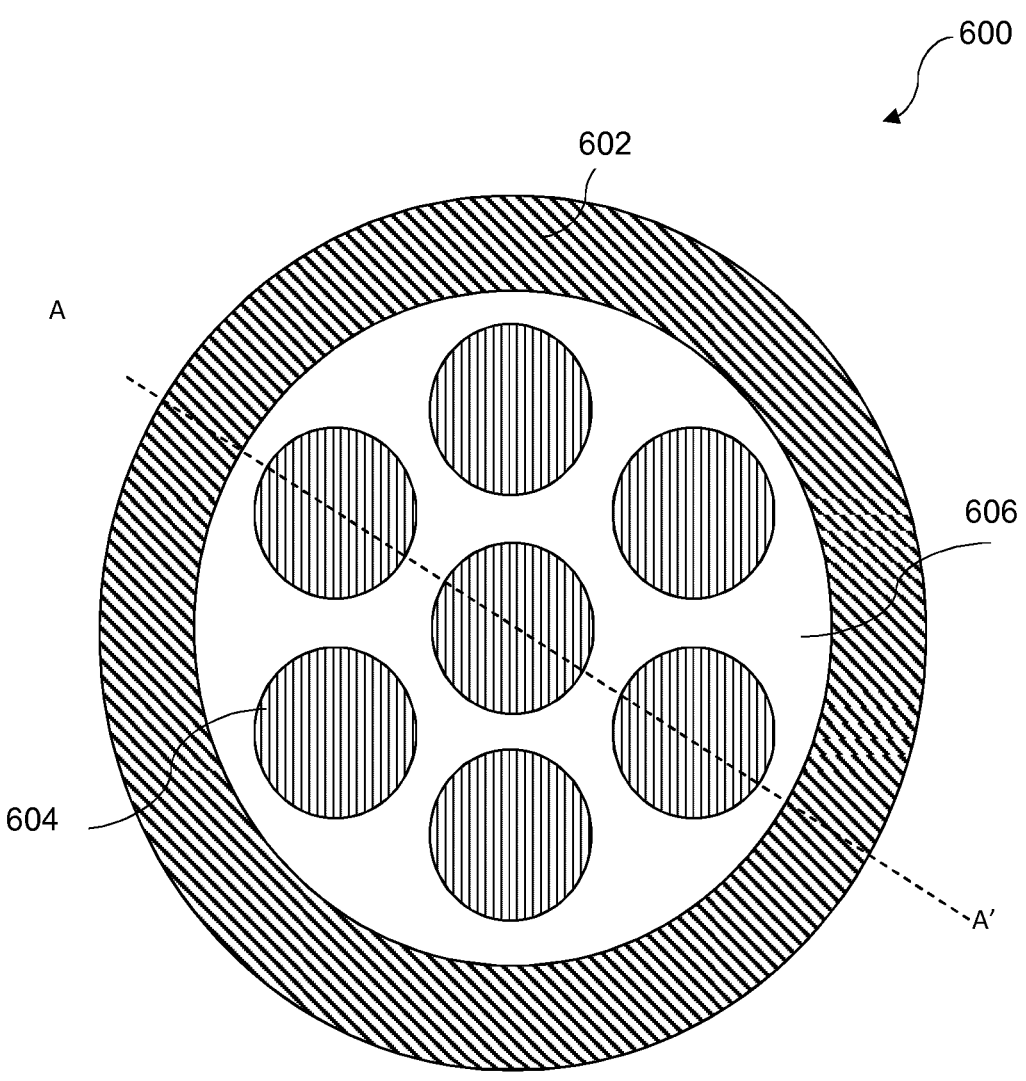
FIG. 6 shows a cross sectional view of a die for use in the production of aerosol-cooling elements according to an embodiment of the present invention.

FIG. 6 shows a cross sectional view of a front side (exit surface) of a die 600 for use in the production of continuous extruded structure 306 according to an embodiment of the present invention. The die includes a female part 602, a male part 604 and a cavity 606 therebetween.

Figure 7:
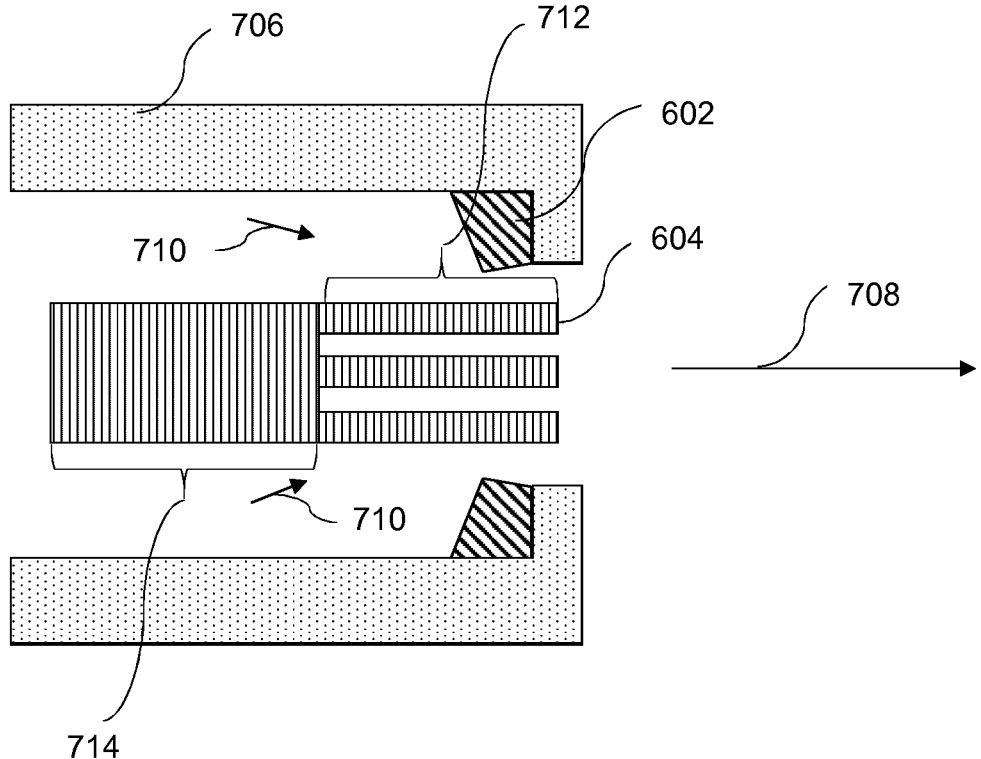
FIG. 7 shows a view of the die of FIG. 6 cut along axis AA' within a chamber.

FIG. 7 shows a view of the die 600 cut along line AA', within a chamber 706. Arrows 710 indicates directions of flow of molten material within the chamber 706. Arrow 708 indicates a direction of extrusion flow exiting the extruder 400. As can be seen in FIG. 7, a front end 712 of the male part 604 of the die includes a shaped structure and a rear end 714 of the male part 604 of the die is a solid formation.

FIGS. 6 and 7 shows one example of a die 600 that can be used in the extrusion process to form the internal surface 102 and the external surface 104 simultaneously. In this example, the male part 604 of the die 600 comprises a central column and six surrounding columns. The female part 602 of the die 600 is an annulus surrounding the male part 604. Advantageously, a die of a configuration such as the die 600 in FIGS. 6 and 7 produces an extruded member with peripheral empty tubular pathways 110 around a central empty tubular pathway.

In other examples, dies may be used that lead to a variety of different sizes and shapes of pathways in the finished extruded member. For example, the male part 604 may have different cross-sectional shapes that would lead to pathways of different cross-sectional shapes in the extruded member 100. Example cross sections may include any polyhedron such as a pentagonal prism, a hexagonal prism or an octagonal prism, concentric annular shapes etc. In a particular example, a male part with a substantially star shaped cross section would result in a pathway with a substantially star shaped cross section. This would have the effect of increasing the surface area of the internal empty pathways inside the extruded member. This increase in surface area of the internal pathways has the effect of increasing effectiveness of the rods at reducing the temperature of the aerosol drawn through it.

In some examples of the invention, before the continuous extruded structure 306 is cut into the extruded members 100, further material is extruded around the continuous extruded structure 306 to coat the continuous extruded structure with an extruded outer coating.

Figure 8:
FIG. 8 shows a schematic diagram of an apparatus for extrusion of further material to coat a continuous extruded structure with an extruded outer coating according to an embodiment of the present invention.
Figure 8:
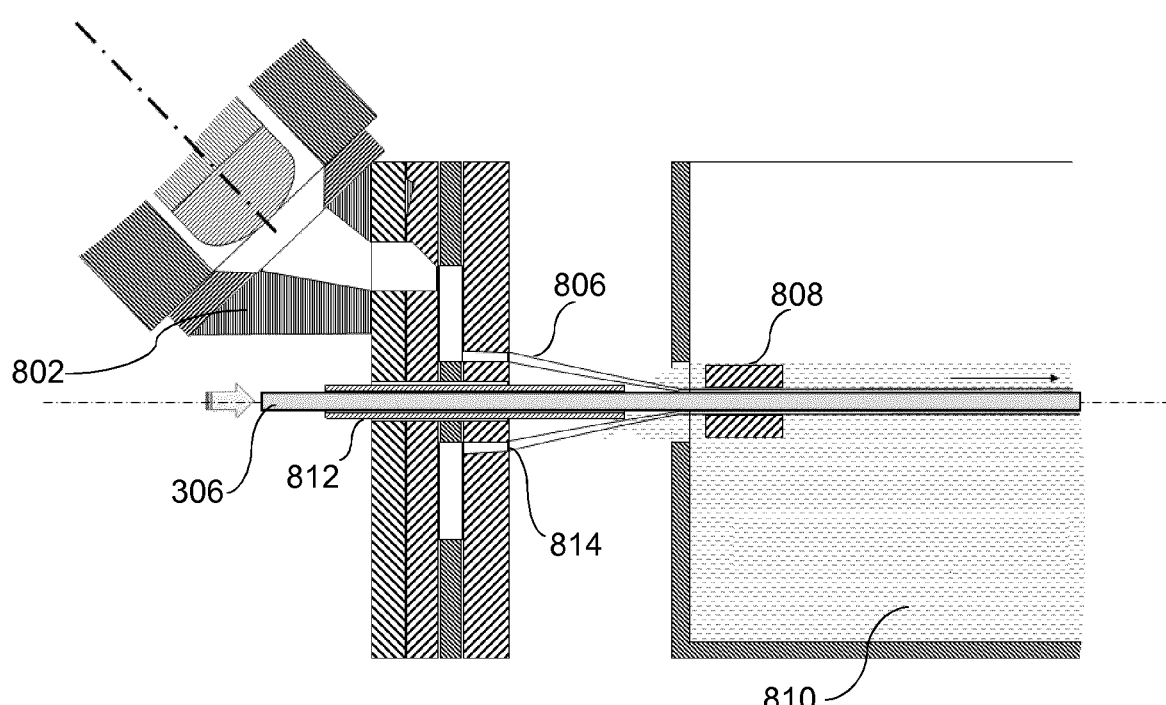

FIG. 8 shows a schematic diagram of an apparatus for extrusion of further material to coat the continuous extruded structure 306 with an extruded outer coating according to an embodiment of the present invention.

Apparatus 800 includes a second extruder 802, a second die 814, a diameter checking system 808 and a cooling area 810. The continuous extruded structure 306 can be fed into apparatus 800 through aperture 812.

Figure 9:
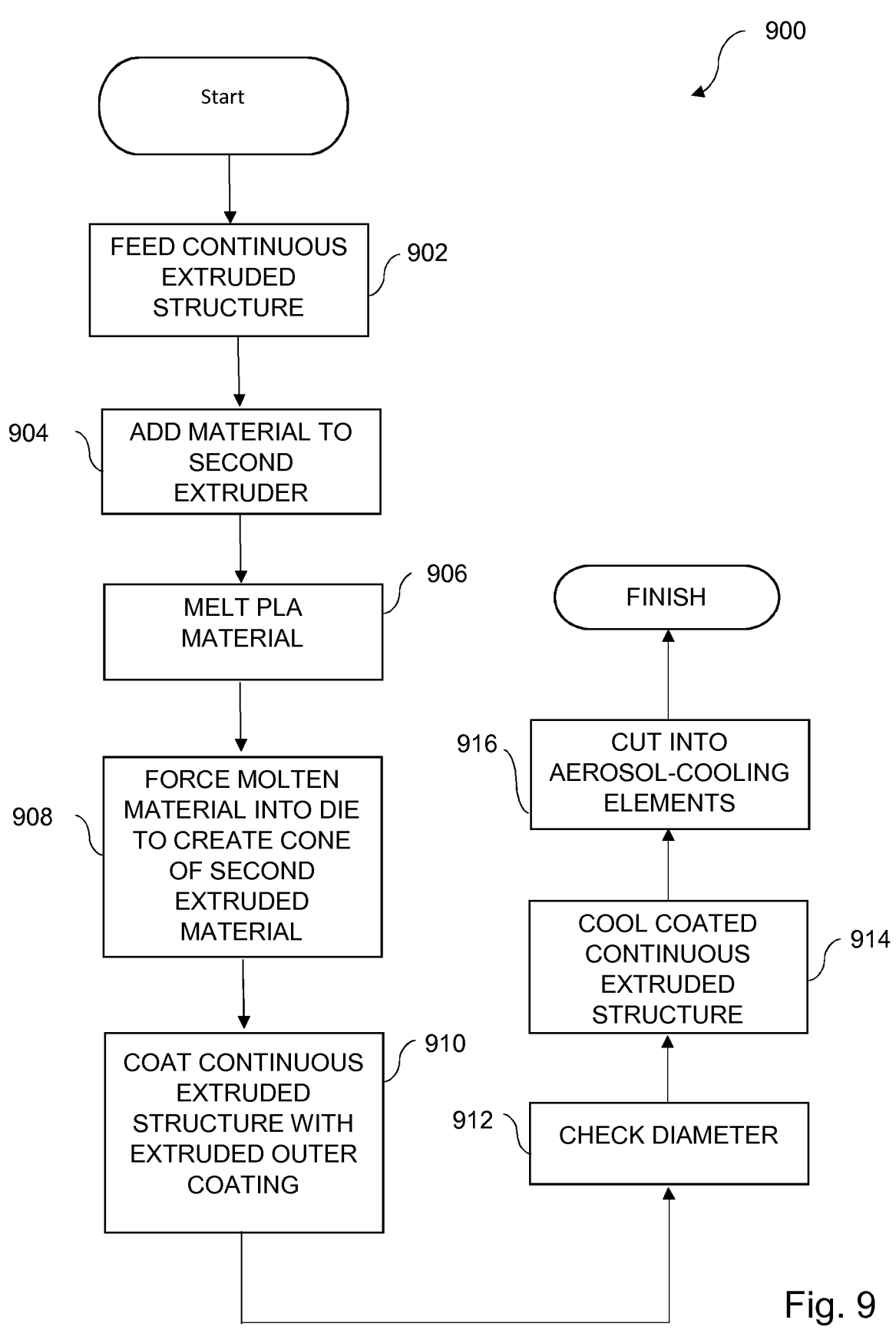
FIG. 9 shows a flow diagram of a method for extrusion of further material to coat the continuous extruded structure with the extruded outer coating according to an embodiment of the present invention.

FIG. 9 shows a flow diagram of a method for extrusion of further material to coat the continuous extruded structure with the extruded outer coating according to an embodiment of the present invention.

With regard to FIG. 9, the continuous extruded structure 306 is fed 902 continuously into apparatus 800 through aperture 812. Raw material (for example, PLA pellets) is added 904 to the second extruder 802. The raw material is melted 906 by a second heater in the second extruder 802. Molten material is forced 908 into the second die 814 to create a cone of second extruded material 806. The second extruded material 806 is then deposited onto the continuous extruded structure 306 as it is fed through aperture 812 to coat 910 the continuous extruded structure 306 with an extruded outer coating. A diameter of the coating may be checked 912 at this stage by diameter checking system 808. The coated continuous extruded structure 306 is then cooled 914 in the cooling area 810. By the time the coated continuous extruded structure 306 reaches the cooling area 810, the diameter of the coating is substantially constant. At the cooling area 810, the coated continuous extruded structure 306 is immersed into, or otherwise exposed to, a cooling material. The cooling material may be a liquid or a gas substance and can be adapted according to the nature of the material used in the extrusion process for adequate cooling. Finally, the cooled, coated continuous extruded structure 306 is cut 916 into the aerosol-cooling elements 204 to be used in aerosol-generating articles.

The diameter of the extruded material is proportional to the speed of the extrusion by the second extruder 802. The faster the molten material is forced into the second die 814 by the extruder screw, the larger the diameter of the coating. The diameter of the coating is also proportional to the speed at which the coated continuous extruded structure 306 is pulled out of the puller system. The faster the coated continuous extruded structure 306 is pulled out of the puller system the smaller the diameter of coating. Another factor that influences the diameter of the coating is the distance the cooling unit 810 is from an outflow aperture of the second extruder 802. The diameter of the coating may decrease with increased distance from the outflow aperture. These techniques may be used singularly or in combination to achieve a desired diameter of the coating of the aerosol-cooling elements 204.

In some examples, the apparatus (300, 800) comprises one or more control systems. These control systems may be capable of monitoring various parameters. The control systems may be located at the end of production, on samples of production and/or during production. For example, the diameter checking system 808 may be one of at least one diameter measurement systems and may be an online system. The online checking system may send a reading to a control system that, according to the reading, is able to adjust parameters of the above described diameter influencing techniques such that the diameter of the extruded material remains within a predetermined diameter size tolerance. Furthermore, the diameter checking system 808 may be configured to send a warning signal to a downstream actuator to reject extruded members which the diameter checking system 808 has determined have been manufactured with an extruded member having the wrong diameter.

Using extrusion as described in the methods 500 and 900 with respective apparatuses 300 and 800 of the present invention allows the manufacture of aerosol-cooling elements 204 which are mechanically stable and have a consistent profile. An extruded profile created during the extrusion is less variable than a profile created by foil compression methods.

The aerosol-cooling elements 204 derived from methods 500 and 900 have the further advantage that there is no gluing stage, as a continuous cylinder is directly formed by way of extrusion. Removing the necessity of the gluing stage removes related issues such as opening at a weak seam and diameter control failure as the diameter of the aerosol-cooling element 204 increases over time due to expansion of the wrapping material. The diameter of the aerosol-cooling element 204 created by methods of the present invention is relatively consistent once the extruded material is cooled.

Furthermore, the methods of the present invention allow a thickness of the extruded members 100 to be set. This may lead to little or no weight control failure of the extruded members 100.

Figure 10:
FIG. 10 shows a cross sectional view of an extrusion die.
Figure 10:
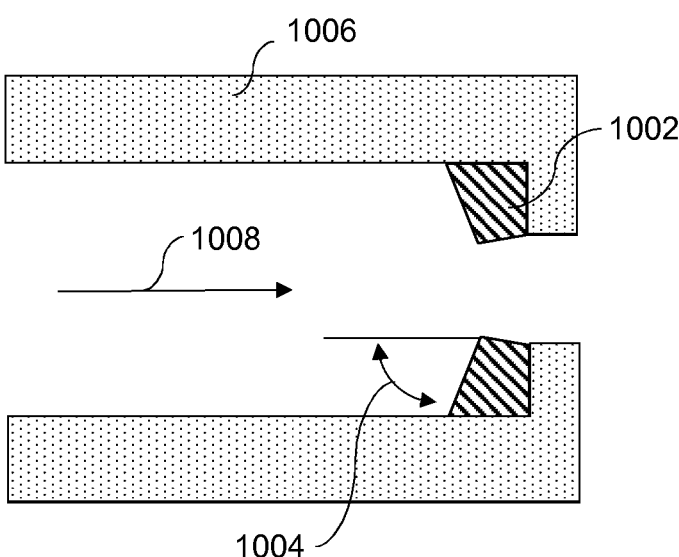

FIG. 10 shows a cross sectional view of a die according to an embodiment. The die 1000 in FIG. 10 differs from the die 600 in FIGS. 6 and 7 in that an angle 1004 between an innermost part of the female part 1002 of the die 1000 and the direction of flow of incoming extruded material, illustrated by arrow 1008, is reduced. A reduced angle 1004 may increase frictional forces on the extruded material as it is forced through the die 1000. This in turn may have the effect of increasing surface irregularities. Surface irregularities are any non-smooth features (e.g. cracks, holes, breaks, bumps etc) on the external or internal surface of the extruded member. These surface irregularities may improve thermal transfer properties of the aerosol-cooling element with air. This is advantageous as a lower temperature of the aerosol, in the aerosol-generating article comprising the aerosol-cooling element, can be achieved.

Other techniques may be employed to increase surface irregularities. One example technique is to rapidly cool the extruded material, for example, by immersion in a very cold fluid to produce a temperature gradient between the interior and exterior of the extruded material. This temperature gradient may lead to stresses in the extruded material and result in the appearance of surface cracks. Other example techniques include: increasing the speed of extrusion, increasing the friction inside the chamber and increasing the friction with the die. These may all lead to surface irregularities which may increase the thermal transfer of the aerosol-cooling element with surrounding air.

Further advantages of the above described invention may include a reduction in the amount of material required and a reducing in overall cost of manufacturing. The material required may be reduced due to a lower final product weight in comparison to non-extrusion aerosol-cooling element manufacturing techniques such as a foil compression process. The overall cost may be reduced since extrusion is done directly from raw material such as pellets. This is different from the foil compression process which requires the pellets to be converted into a foil which is then shaped into a rod.

The invention claimed is:

1. An aerosol-generating article comprising an aerosol-cooling element, wherein the aerosol-cooling element comprises:

an extruded member formed from a polymer material;

the extruded member having a length, and the extruded member comprising:

an external surface defining the perimeter of a cross section perpendicular to the length of the extruded member; and an internal surface defining one or more pathways through the length of the extruded member;

wherein the internal surface or the external surface or both the internal surface and the external surface comprise surface irregularities in the form of cracks or holes, that improve thermal transfer properties of the aerosol-cooling element with air.

2. The aerosol-generating article according to claim 1, wherein the one or more pathways comprise at between 50% to 90% of the area of cross section defined by the external surface.

3. The aerosol-generating article according to claim 1, wherein the aerosol-cooling element comprises two or more pathways.

4. The aerosol-generating article according to claim 1, wherein the extruded member has a circular cross section of diameter from 5 to 10 mm.

5. The aerosol-generating article according to claim 1, wherein the extruded member has a length from 7 to 28 mm.

6. The aerosol-generating article according to claim 1, wherein the extruded member comprises polylactic acid.

7. The aerosol-generating article according to claim 1, further comprising an aerosol substrate and a filter, and wherein the aerosol-cooling element is positioned between the filter and aerosol-generating substrate.

8. The aerosol-generating article according to claim 1, wherein the extruded member is formed by a method comprising:

extruding the extruded member; and cooling the extruded member after extrusion by contact with a cooled substance, such that thermal stresses are induced in the extruded member, wherein the thermal stresses form the surface irregularities in the form of cracks or holes.

9. A method of manufacturing an aerosol-cooling element of an aerosol-generating article, the method comprising:

providing a polymer material;

extruding the polymer material through a die to form a continuous extruded structure comprising an internal surface and an external surface, the internal surface defining one or more pathways within the continuous extruded structure and the external surface defining a perimeter of a cross section of the continuous extruded structure;

inducing surface irregularities in the external surface or the internal surface or both the external surface and the internal surface, wherein the surface irregularities are in the form of cracks or holes that improve thermal transfer properties of the aerosol-cooling element with air; and cutting the continuous extruded structure to form the aerosol-cooling element.

10. The method according to claim 9, wherein the material is extruded through the die such that the one or more pathways are formed with a total cross sectional area that is between 50% and 90% of the area of the cross section of the continuous extruded structure.

11. The method according to claim 9, wherein the material is extruded through the die such that two or more pathways are formed.

12. The method according to claim 9, wherein the material is extruded through the die such that the cross section of the continuous extruded structure is circular with a diameter from 5 to 10 mm.

13. The method according to claim 9, wherein the continuous extruded structure is cut to a length from 7 to 28 mm.

14. The method according to claim 9, wherein the step of inducing surface irregularities comprises rapidly cooling the continuous extruded structure.

15. The method according to claim 9, wherein, before the continuous extruded structure is cut, the method further comprises:

providing the continuous extruded structure; and extruding further material through a second die to coat the continuous extruded structure with an extruded outer coating.

16. A method for making an aerosol-generating article comprising:

forming an aerosol-cooling element by the method of claim 8;

incorporating the aerosol-cooling element into an aerosol-generating article.

* * * * *